United States Patent
Ishihara et al.

(10) Patent No.: US 7,534,523 B2
(45) Date of Patent: May 19, 2009

(54) BATTERY PACK AND ELECTRONIC EQUIPMENT USING THE SAME

(75) Inventors: Hajime Ishihara, Iharaki (JP); Shuuichi Miyazaki, Chiba (JP); Soiji Oshimi, Tokyo (JP); Kazuya Sugeno, Fukushima (JP)

(73) Assignee: Sony Computer Entertainment Inc., Tokyo (JP)

( * ) Notice: Subject to any disclaimer, the term of this patent is extended or adjusted under 35 U.S.C. 154(b) by 746 days.

(21) Appl. No.: 11/084,682

(22) Filed: Mar. 18, 2005

(65) Prior Publication Data

US 2006/0063064 A1 Mar. 23, 2006

(30) Foreign Application Priority Data

Sep. 21, 2004 (JP) ............................ 2004-028465
Nov. 26, 2004 (JP) ............................ 2004-342704

(51) Int. Cl.
    *H01M 2/10* (2006.01)
(52) U.S. Cl. ........................... 429/98; 429/96; 429/100
(58) Field of Classification Search .................. 429/96, 429/98, 100; D13/103
    See application file for complete search history.

(56) References Cited

U.S. PATENT DOCUMENTS

| | | | |
|---|---|---|---|
| 5,573,869 A | 11/1996 | Hwang et al. | |
| 5,621,618 A | 4/1997 | Komiyama | |
| D406,098 S * | 2/1999 | Walter et al. | D13/103 |
| 6,127,063 A | 10/2000 | Kowalsky et al. | |
| 6,405,023 B1 * | 6/2002 | Stange et al. | 455/90.1 |
| 6,710,576 B1 | 3/2004 | Kaufman et al. | |
| D526,612 S * | 8/2006 | Sugeno et al. | D13/103 |
| 2004/0058231 A1 | 3/2004 | Takeshita et al. | |
| 2004/0145872 A1 | 7/2004 | Zhou | |

FOREIGN PATENT DOCUMENTS

| | | |
|---|---|---|
| EP | 0 893 903 | 1/1999 |
| EP | 1 030 386 | 8/2000 |
| EP | 1 033 766 | 9/2000 |
| EP | 1 244 156 | 9/2002 |
| EP | 1 411 564 | 4/2004 |

(Continued)

OTHER PUBLICATIONS

Notification of Reasons for Refusal dated Jan. 31, 2006 with translation.

(Continued)

*Primary Examiner*—Gregg Cantelmo
(74) *Attorney, Agent, or Firm*—Katten Muchin Rosenman LLP

(57) ABSTRACT

The present invention provides a battery pack which is capable of enhancing a short-circuit prevention effect, and electronic equipment using this battery pack. The battery pack 31 has a battery built in the case 32 and an output terminal 47 which is electrically connected to the battery and provided in such a manner as directed towards the outside of the case 32. The battery pack 31 has an output section 34 that is provided in orthogonal to a virtual plane including a mount reference plane for the electronic equipment (under surface 33B) of the case 32, with a space between the virtual plane and the output section 34. The output section 34 is provided with an output terminal 47.

12 Claims, 10 Drawing Sheets

FOREIGN PATENT DOCUMENTS

| | | |
|---|---|---|
| FR | 2 835 681 | 8/2003 |
| GB | 2 358 744 | 8/2001 |
| JP | 63-119156 | 5/1988 |
| JP | 8-250089 | 9/1996 |
| JP | 2000-67832 | 3/2000 |
| JP | 2000-123807 | 4/2000 |
| JP | 2000-323108 | 11/2000 |
| JP | 2001-035462 | 2/2001 |
| JP | 2001-351593 | 12/2001 |
| JP | 2002-025522 | 1/2002 |
| JP | 2003-36828 | 2/2003 |
| JP | 2003-068261 | 3/2003 |
| JP | 2003-92172 | 3/2003 |
| JP | 2004-214143 | 7/2004 |

OTHER PUBLICATIONS

Vietnamese Office Action dated March 13, 2007.
French Search Report dated Dec. 23, 2005.
Translation of the German Office Action dated Jul. 23, 2007, from the corresponding German Application.
Great Britain Search Report dated Sep. 20, 2005, from corresponding Great Britain Application No. GB0508192.2.
Australian Office Action dated Feb. 17, 2006, from corresponding Australian Application No. 2005201172.
Korean Office Action dated Jul. 30, 2007, from the corresponding Korean Application.
Notification of Reasons for Refusal dated Nov. 1, 2005 with translation.
United Kingdom Search Report dated Jun. 16, 2005.

* cited by examiner

BATTERY PACK AND ELECTRONIC EQUIPMENT USING THE SAME

BACKGROUND OF THE INVENTION

The present invention relates to a battery pack and electronic equipment using the same. For example, it relates to a battery pack being utilized as a power source for portable type electronic equipment, such as a portable game machine, Personal Digital Assistants (PDA), portable phone, and CD (Compact Disk) player, and the electronic equipment using the battery pack.

Portable electronic equipment such as a portable game machine, PDA, portable phone, and CD player employs a battery pack. The battery pack, in particular, the one being used in the portable electronic equipment, has a structure that the battery is built in a case having a flat box shape, and an output terminal electrically connected to the battery is provided in such a manner as being directed towards the outside of the case. When the battery pack is mounted on the electronic equipment, the output terminal is electrically connected to a terminal of the electronic equipment, and power is supplied from the battery into the electronic equipment through those terminals.

In the meantime, there is a type of battery pack on which the output terminal is provided in such a manner as exposed at the exterior surface of the case. Since there is a fear of short-circuit in such a structure as described above, countermeasures have been taken so far. In general, most battery packs employ a structure where a window for the output terminal is formed on a part of the case, and the output terminal is placed inside the window (for example, see the Japanese Patent Laid-open Publications No. 2004-214143 and No. 2000-323108).

SUMMARY OF THE INVENTION

If a battery takes the structure where a window used for the output terminal is formed on a part of the case and the output terminal is placed inside the window, a short-circuit prevention effect may be expected more than the structure where the output terminal is exposed on the exterior surface of the case. However, this short-circuit preventing means is far from being sufficient. For example, in the structure where a window for the output terminal is formed on a part of the case and the output terminal is placed inside the window, the output terminal is arranged in close proximity to the window. Therefore, when the battery pack is placed with the window-formed surface down, a member on which the battery pack is placed may get into the battery through the window, if the member has flexibility, and thus the output terminal may be short-circuited.

The present invention helps to provide a battery pack which is capable of enhancing the effect for the short-circuit prevention, and electronic equipment using this battery pack.

The battery pack according to the present invention is used in a status being mounted on electronic equipment, a battery being built in a case and an output terminal electrically connected to the battery, the output terminal being mounted in such a manner as directed towards the outside of the case, wherein the battery pack has a different-level portion that is provided in orthogonal to a virtual plane including a mount reference plane of the case for the electronic equipment, with a space between the virtual plane and the different-level portion, and the output terminal is provided on this different-level portion. Here, the situation where the output terminal being directed towards the outside of the case indicates not only a situation where the output terminal is provided outside the case in exposed manner, but also a situation where the output terminal is provided inside the opening formed on the case.

According to the present invention, when the battery pack is placed on a table and the like, with the mount reference plane facing below, there is a low possibility that the output terminal directly comes into contact with the upper surface of the table, since a space is formed between the surface of the table and the output terminal. Therefore, it is possible to enhance the short-circuit prevention effect. In addition, since there is formed a space between the virtual plane including the mount reference plane of the case and the different-level portion on which the output terminal is provided, it is possible to absorb a projecting portion of circuit board of electronic equipment. For example, in the case where a terminal projects from the circuit board of the electronic equipment, the root portion of the terminal may be reinforced by placing a strengthening part on the upper surface of the circuit board. Even in such a case, the space formed below the different-level portion may absorb the strengthening part. In other words, since there is no interference with the strengthening part, it is possible to enhance the degree of flexibility in designing the battery pack storage. Furthermore, when the battery pack is stored in the battery pack storage, the end portion on the opposite of the output terminal side is inserted in a slanting direction into the battery pack storage, and the other end portion on the output terminal side is gradually tilted in the horizontal direction pivoting about the end portion already inserted. Then, after most part of the battery pack is stored in the battery pack storage, the output terminal comes into contact with the terminal provided on the electronic equipment side. Therefore, the terminals are less damaged.

In the present invention, it is preferable that the case includes a main body having approximately rectangular box shape with the battery built therein, and an output section having the output terminal integrally formed on the plane of the main body, wherein, the output section is provided as a different-level portion, assuming any one of the six planes constituting the exterior surface of the main body as the mount reference plane, being orthogonal to a plane of the main body on which the output section is formed. According to the present invention, since it is configured such that the output section is integrally formed on one plane of the main body having approximately rectangular box shape, that is, the shape is like a rectangular box as a whole, it is easily handled at the time of carrying, and only a small space is required for a storage in the electronic equipment.

In the present invention, it is preferable that the output section is provided at a position deviated towards a corner of one side on one plane of the main body. According to the present invention, since the output section is provided at a position deviated towards a corner of one side on one plane of the main body, it is possible to form between the output section and the corner on the other side, an engagement section for fixing the battery pack onto the electronic equipment when the battery pack is mounted on the electronic equipment, or a finger-hold section for ejecting the battery pack from the electronic equipment.

In the present invention, it is preferable that the case are provided with a first engagement and a second engagement to be engaged with the electronic equipment, respectively on the plane on the opposite side of the plane on which the output section is provided, and the plane on which the output section is provided, when the battery pack is mounted on the electronic equipment. According to the present invention, since the first engagement and the second engagement to be engaged with the electronic equipment are respectively provided on the plane opposite to the plane on which the output section is provided, and on the plane on which the output section is provided, that is, the engagements are respectively provided on the both side surfaces of the case opposed to each other, it is possible to securely hold the battery pack on the electronic equipment.

In the present invention, the first engagement is formed by an engagement projection which projects from the plane of the case and has a locking surface approximately parallel to the mount reference plane, and the second engagement is formed by an engagement projection which projects from the plane of the case and has a locking surface approximately parallel to the mount reference plane, together with an inclined plane gradually approaching the case outer surface along the direction from a tip end of the locking surface to the mount reference plane. According to the present invention, when the battery pack is stored in the battery pack storage of the electronic equipment, the end portion opposite of the output section side is inserted in a slanting direction into the battery pack storage, and after the first engagement is engaged with the locking portion of the electronic equipment, the other end portion on the output terminal side is gradually tilted in the horizontal direction pivoting about the end portion already inserted, and then the inclined plane of the second engagement is inserted in such a manner as abutting against a wall of the battery pack storage of the electronic equipment. When the locking surface of the second engagement reaches the locking portion of the battery pack storage, the battery pack is fixed in a status where the locking surface is inserted in the locking portion. Therefore, only by inserting one end of the battery pack in slanting direction and the other end is inserted in the storage in such a manner as tilted in the horizontal direction, it is possible to store the battery pack within the battery pack storage of electronic equipment. Accordingly, the battery pack can be easily mounted and securely held after the mounting.

In the present invention, it is preferable that on one plane of the main body, the output section is provided in such a manner as deviated towards a corner of one side, and an ejection-purpose fingerhold is provided between the output section and a corner on the other side. In addition, two of the first engagements are provided on the plane opposite of the plane on which the output section of the case is provided, at positions having approximately the same distance from the ejection-purpose fingerhold as a center. According to the present invention, when the battery pack is ejected from the battery pack storage of the electronic equipment, it can be taken out by putting a finger on the ejection-purpose fingerhold. Therefore, the ejection operation is easily performed. In this situation, two of the first engagements are provided at positions having approximately the same distance from the ejection-purpose fingerhold as a center, whereby the battery pack is allowed to be upright without being tilted. Therefore, the ejecting operation is easily performed.

The electronic equipment of the present invention is characterized in that it has a battery pack storage that stores any of the battery packs as described above. Furthermore, the electronic equipment of the present invention is characterized in that it includes a battery pack storage which stores a battery pack having a battery built in a case, and an output terminal electrically connected to the battery is provided in such a manner as being directed towards the outside of the case, wherein, the case of the battery pack is provided with a first engagement and a second engagement respectively on a plane opposite of the plane on which the output terminal is provided, and on the plane on which the output terminal is provided, and locking portions are formed respectively on opposed walls of the battery pack storage for locking the first engagement and the second engagement respectively.

According to the present invention, when the battery pack is stored in the battery pack storage of the electronic equipment, the end portion on the side opposite of the output terminal side is inserted in a slanting direction into the battery pack storage, and after the first engagement is engaged with the lock portion of the battery pack storage of the electronic equipment, the other end portion on the output terminal side is gradually tilted in the horizontal direction pivoting about the end portion already inserted, whereby the inclined plane of the second engagement is inserted in such a manner as abutting against the wall of the battery pack storage of the electronic equipment. When the locking surface of the second engagement reaches the locking portion of the battery pack storage, the battery pack is fixed in a state that the locking surface is inserted in the locking portion. Therefore, only by inserting one end of the battery pack in a slanting direction, and the other end is inserted into the storage in such a manner as tilted in the horizontal direction, it is possible to store the battery pack within the battery pack storage of the electronic equipment, whereby mounting of the battery can be easily performed and the battery is securely held after it is mounted.

DETAILED DESCRIPTION OF THE PREFERRED EMBODIMENTS

Hereinafter, one embodiment of the present invention will be explained with reference to the accompanying drawings.

Figure 1:
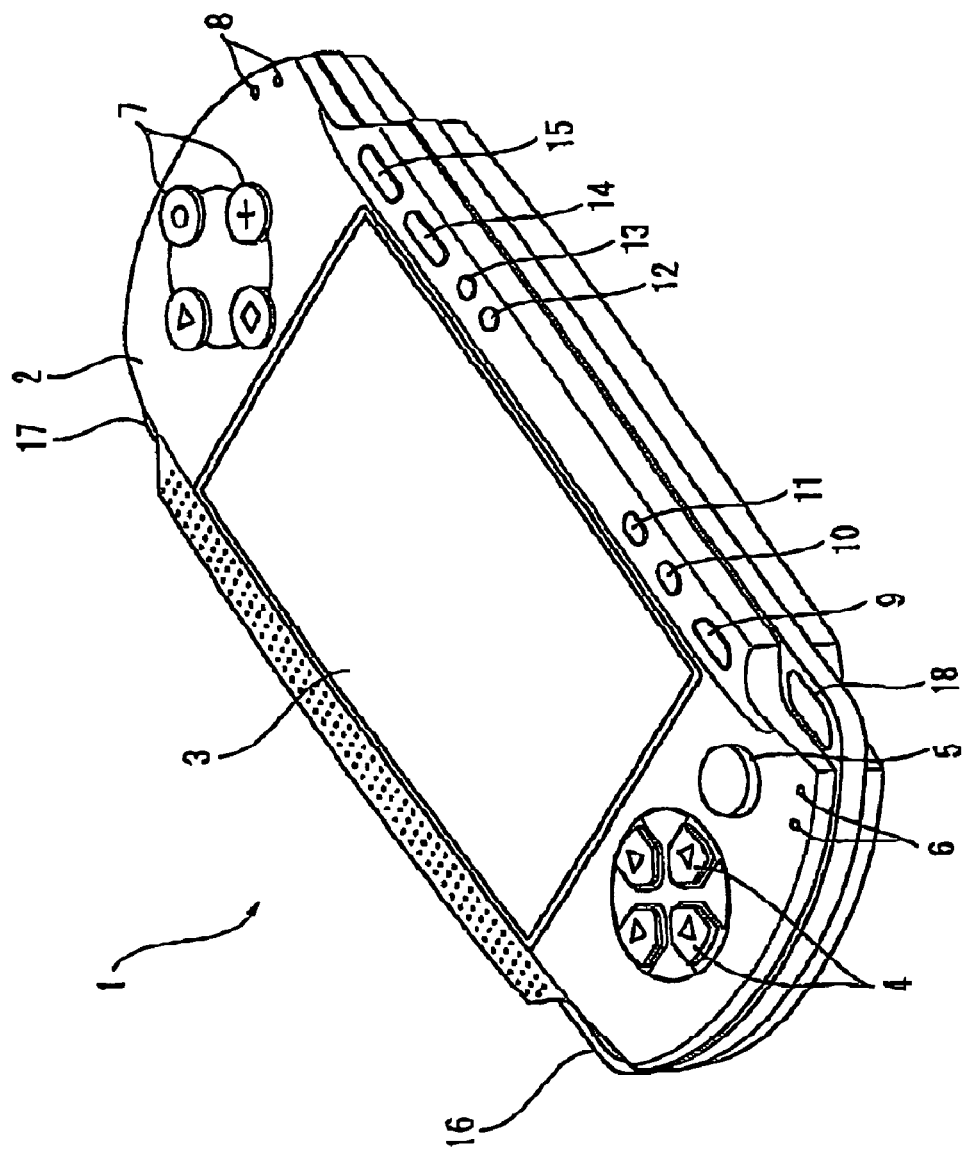
FIG. 1 is a front perspective view of an entertainment apparatus according to one embodiment of the present invention.

<Description of FIG. 1 (Description of the Front Side of the Apparatus)>

FIG. 1 is a front perspective view of an entertainment apparatus 1 according to the present embodiment. The entertainment apparatus 1, for example, reads a game program and the like being recorded on an optical disk such as a CD, DVD (Digital Versatile Disk), MD (Mini disk), and executes the game program and/or reproduces voice information and image information recorded on the optical disk, according to a directive from a key and switches that are operated by a user (game player). Here, execution of a game mainly indicates a control of a progress in the game and outputting of image/voice information and the like.

The entertainment apparatus 1 has a flat landscape rectangular shape, having a case 2 both edges of which are arc-shaped. On the front face of the case 2, there are provided in the middle position a liquid crystal screen 3 having a landscape rectangular shape, and also provided various switches, keys and the like on the both side portions placing the liquid crystal screen 3 therebetween and on the lower edge portion of the liquid crystal screen 3. In other words, there are provided on the left side portion of the liquid crystal screen 3, orientation keys 4 instructing vertical-horizontal orientations with digital signals, an analogue device 5 which also instructs the orientation with analogue signals, and various display LEDs (light emitting diodes) 6. On the right side of the liquid crystal screen 3, there are provided decision keys 7 such as "Δ" "○" "x" "□", various display LEDs 8. On the lower edge portion of the liquid crystal screen 3, there are provided home button 9, volume (+) button 10, volume (−) button 11, display button 12, sound button 13, select button 14, start button 15, and the like. Four corners of the case 2 are notched inwardly, and out of those four notched corners, a left switch 16 and a right switch 17 are respectively provided on the upper both corners, and a strap hooking member 18 is provided on the lower left corner.

Figure 2:
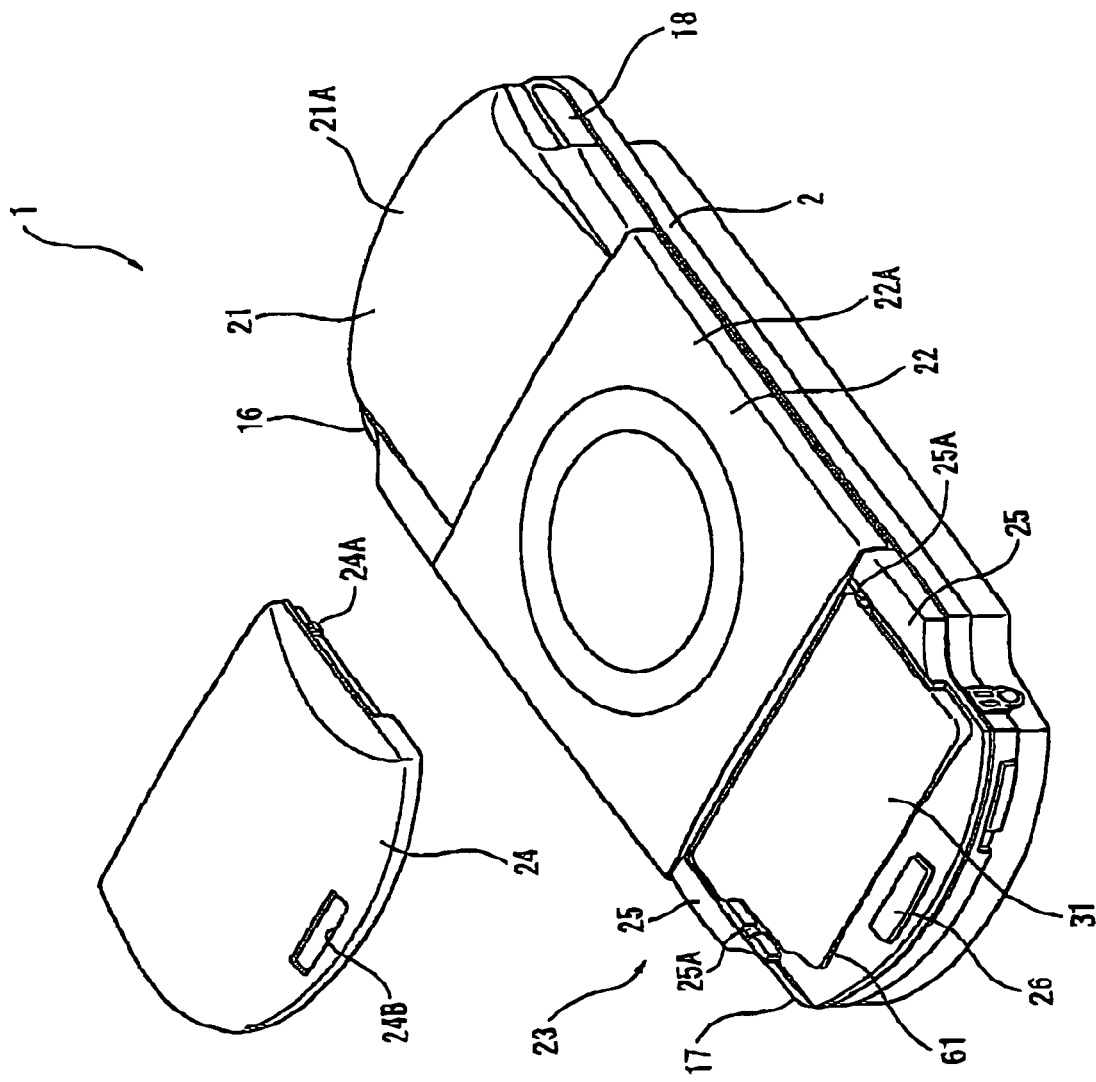
FIG. 2 is a back side perspective view or the entertainment apparatus according to the present embodiment.

<Description of FIG. 2 (Description of the Back Side of the Apparatus)>

FIG. 2 shows a perspective view in a status that the entertainment apparatus 1 as shown in FIG. 1 is horizontally inverted. The back side of the case 2 is partitioned horizontally into three areas, and a memory card storing section 21 is formed on the right side, an optical disk storing section 22 is formed in the middle, and a battery pack storing section 23 is formed on the left side. The memory card storing section 21 is provided with an openable and closable cover 21A, and it is designed for inserting a memory card (not illustrated) inside thereof. The optical disk storing section 22 is provided with a cover 22A openable and closable, and it is designed for inserting an optical disk (not illustrated) inside thereof. The battery pack storing section 23 is provided with a detachable cover 24, and a battery pack storing space 61 for storing the battery pack 31 is formed inside thereof. Around the battery pack storing space 61, there are provided upright walls 25 on the upper and lower edges, and a button 26 to lock the cover 24 on the edge being opposite of the optical disk storing section 22 side. Notched grooves 25A are formed on the inside wall of the upright walls 25. The cover 24 is provided with L-shaped engagement projections 24A to be engaged with the notched grooves 25A and an engagement hole 24B which the button 26 fits into. After the battery pack 31 is stored in the battery pack storing space 61, the cover 24 is made to slide into the right direction, in the example of FIG. 2, from the edge being opposite of the optical disk storage 22 side, the engagement projections 24A of the cover 24 are engaged with the notched grooves 25A, and the button 26 fits into the engagement hole 24B, thereby mounting the cover 24 on the case 2. Accordingly, the battery pack 31 is pressed down by the cover 24, and held in the battery pack storing space 61. When the button 26 is pushed down and the cover 24 is made to slide into the left direction in the example of FIG. 2, the cover is detached from the case 2 and the battery pack 31 can be taken out.

Figure 3:
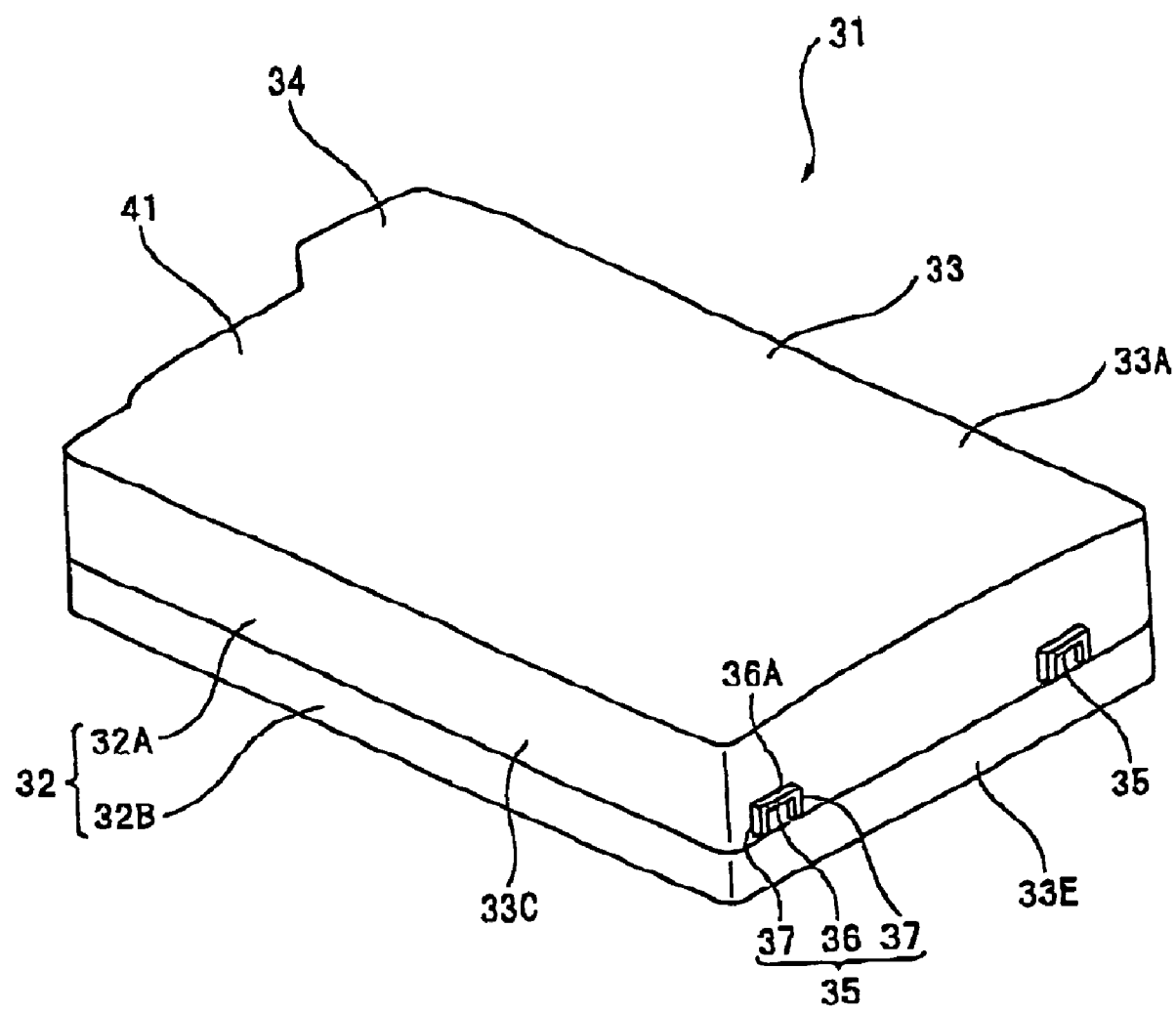
FIG. 3 is a perspective view of the battery pack according to the present embodiment, viewed from the opposite of the output terminal side.
Figure 4:
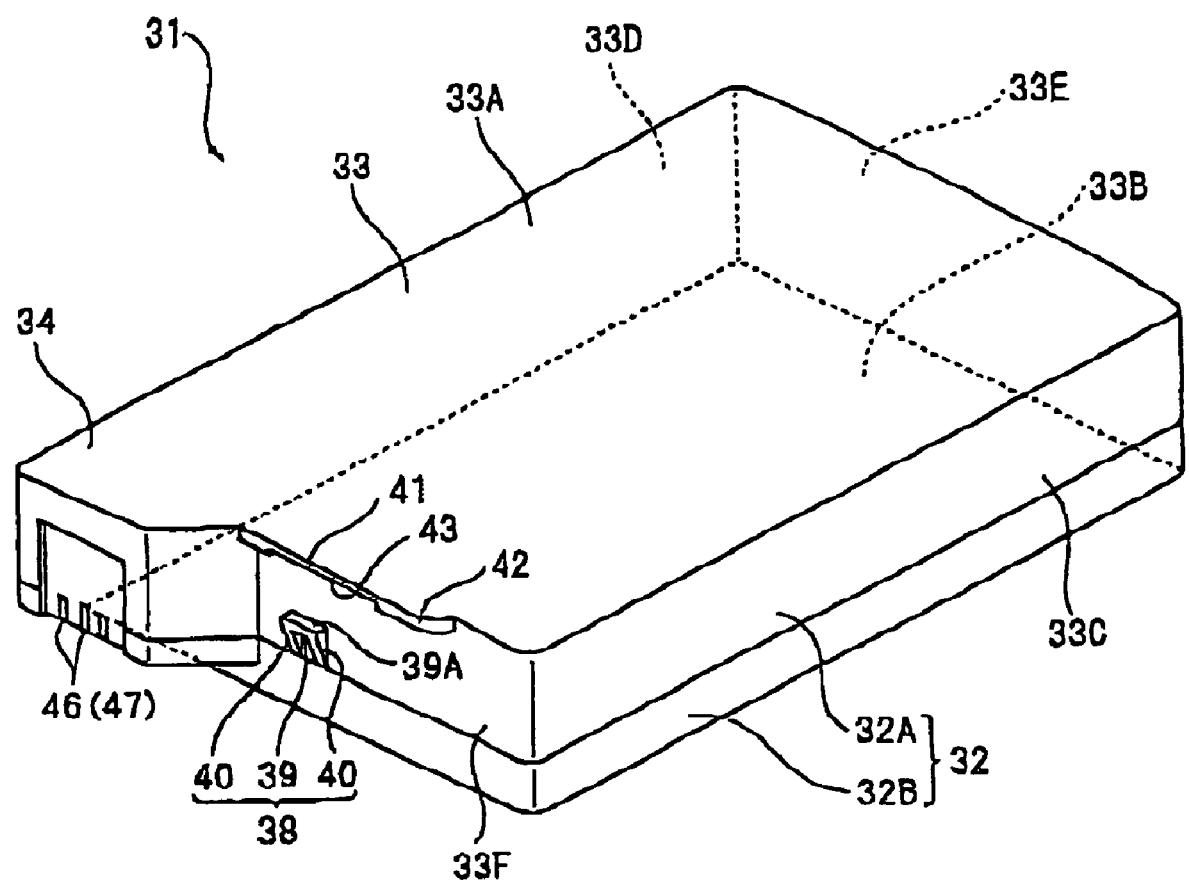
FIG. 4 is a perspective view of the battery pack according to the present embodiment, viewed from the output terminal side.
Figure 5:
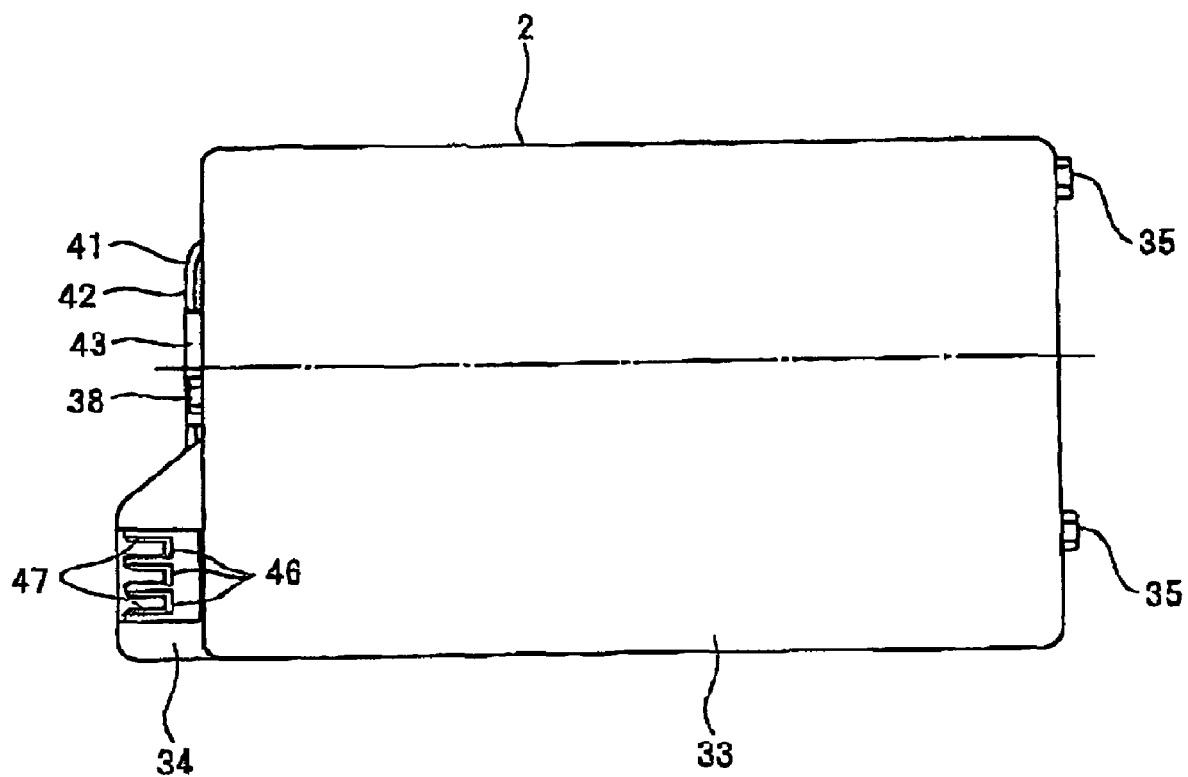
FIG. 5 is a bottom view of the battery pack according to the present embodiment.

<Description of FIGS. 3, 4 and 5 (Description of the Battery Pack)>

FIG. 3 is a perspective view of the battery pack 31 viewed from the side opposite of the output terminal side. FIG. 4 is a perspective view of the battery pack viewed from the output terminal side. FIG. 5 is a bottom view of the battery pack 31. The battery pack 31 is provided with a case 32 which can be separated into an upper case 32A and a lower case 32B. The case 32 includes a main body 33 having an approximately rectangular box shape containing a battery (not illustrated) therein, and an output section 34 having an output terminal 47 electrically connected with the battery, and the output section 34 is integrally formed with one surface of the main body 33 in such a manner as projecting therefrom.

The main body 33 is formed in a flat rectangular parallelepiped shape having the upper surface 33A, under surface 33B, two long side surfaces 33C and 33D, and two short side surfaces 33E and 33F. The upper surface 33A has a gradually curved shape, in such a manner as approaching the under surface 33B, as the upper surface is traced from the central part to the long side surfaces 33C and 33D. The under surface 33B is formed as a flat plane as a mount reference plane for being mounted onto electronic equipment (entertainment apparatus 1). The two long side surfaces 33C and 33D are parallel to each other, and formed as flat planes being perpendicular to the under surface 33B. The two short side surfaces 33E and 33F are also parallel to each other, and formed as flat planes, being perpendicular to the under surface 33B and also perpendicular to the long side surfaces 33C and 33D.

The shorter side surface 33E is provided with two engagement projections 35 as a first engagement, which are engaged with a surrounding wall of the battery pack storing space 61 of the case 2, the engagement projections 35 being on approximately the same height from the under surface 33 and with a predetermined distance therebetween at the height. Each engagement projection 35 is formed in a horseshoe shape, provided with a horizontal piece 36 projecting from the short side surface 33E and being approximately parallel to the under surface 33B, and vertical pieces 37 which extend perpendicularly from the both edges of the horizontal piece 36 and towards the under surface 33B. On the upper surface of the horizontal piece 36, a locking surface 36A is formed being approximately parallel to the under surface 33B as a mount reference plane. On the short side surface 33F, the output section 34 is provided in such a manner as deviated towards the corner on one side, and engagement projection 38 as a second engagement section, which is engaged with the surrounding wall of the battery pack storing space 61 of the case Z, and ejection-purpose fingerhold 41 are provided between the output section 34 and the corner on the other side (on the position deviated towards the other side with respect to the center position). The engagement projection 38 is formed in a horseshoe shape, provided with a horizontal piece 39 projecting from the short side surface 33F and being approximately parallel to the under surface 33B, and vertical pieces 40 which extend perpendicularly from the both edges of the horizontal piece 39 and towards the under surface 33B with inclined planes, that is, external surfaces of the vertical pieces approach the outer surface of the case 32, as they are traced from the horizontal piece 39 to the button surface 33B. On the upper surface of the horizontal piece 39, there is formed a locking surface 39A, which is approximately parallel to the under surface 33B as a mount reference surface.

The ejection-purpose fingerhold 41 has a flange 42 which is integrally formed in projecting manner along the upper edge of the short side surface 33F, from the output section 34 to the vicinity of the other corner. There is formed a groove 43 having a notched shape in the central part on the lower surface of the flange 42. The groove 43 is formed in a dimension of width fitting to a finger placed therein. A relation between the groove 43 of the ejection-purpose fingerhold 41 and the engagement projections 35 as the first engagement is shown in FIG. 5, that is, the two engagement projections 35 are provided at the positions with approximately the same distance from a center corresponding to the position of the groove 43 of the ejection-purpose fingerhold 41.

Viewed from the upper side, the output section 34 is formed in a shape of trapezoid having oblique lines tilting in such a manner that the both sides approach each other along the direction being away from the short side surface 33F, and the dimension in thickness direction is made smaller than the thickness dimension of the main body 33. Specifically, the upper surface of the trapezoid shape is in plane with the upper surface of the main body 33, but the under surface of the trapezoid shape is provided in such a manner as having a space from a virtual plane in orthogonal direction (upward direction in FIG. 4) with respect to the virtual plane including the under surface 33B of the main body 33. In other words, the output section 34 is provided as a different-level portion, assuming any one of the six planes constituting the exterior surface of the main body 33 as mount reference plane (under surface 33B), which is orthogonal to a plane of the main body 33 (short side surface 33F) on which the output section 34 is formed. Three slit grooves 46 are formed with constant pitch intervals on the end side (left side surface in FIG. 4) and on the under surface of the output section 34, and the output terminal 47 is placed within those slit grooves 46. In other words, the output terminal 47 is provided in such a manner as being directed towards the outside of the case 32.

Figure 6:
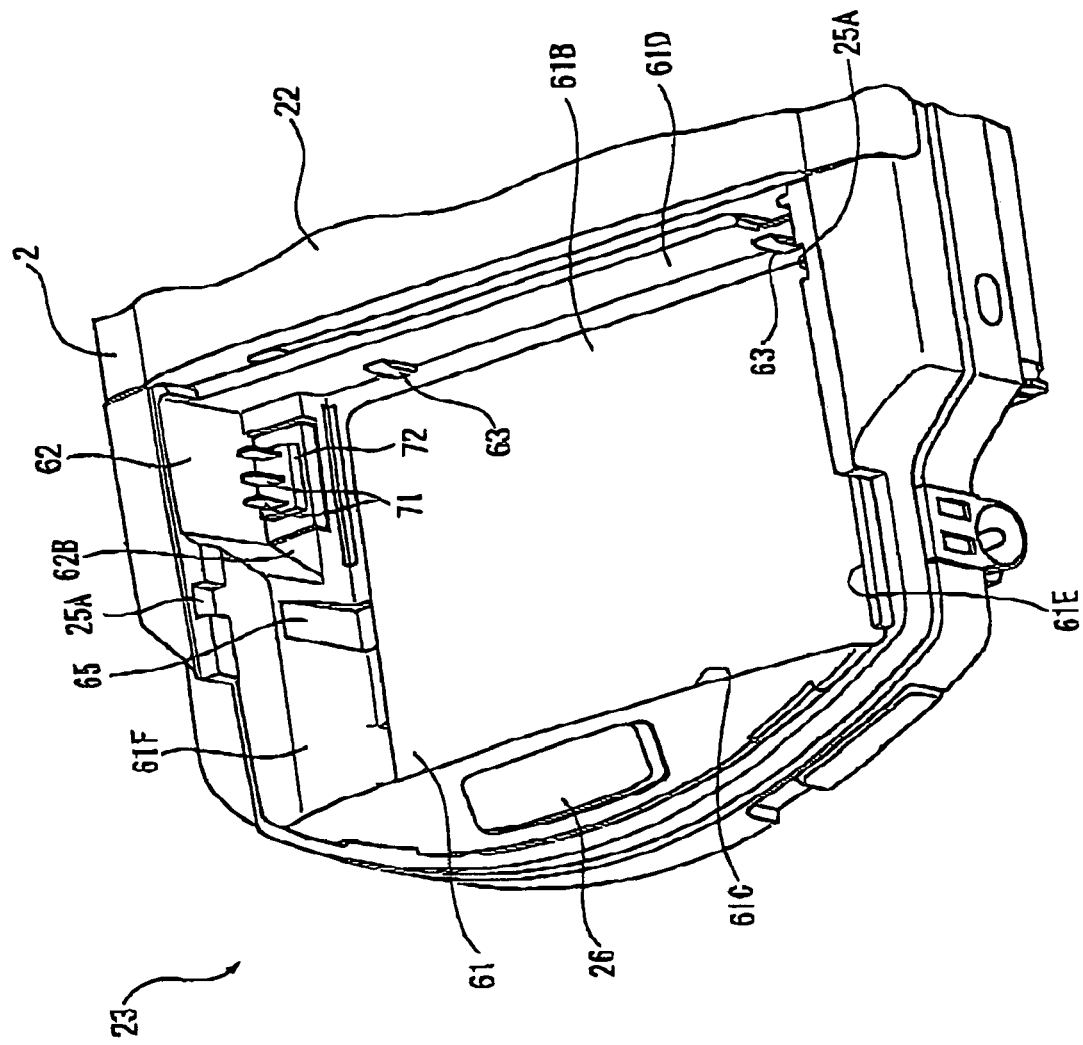
FIG. 6 is a perspective view of the battery pack storage according to the present embodiment.
Figure 7:
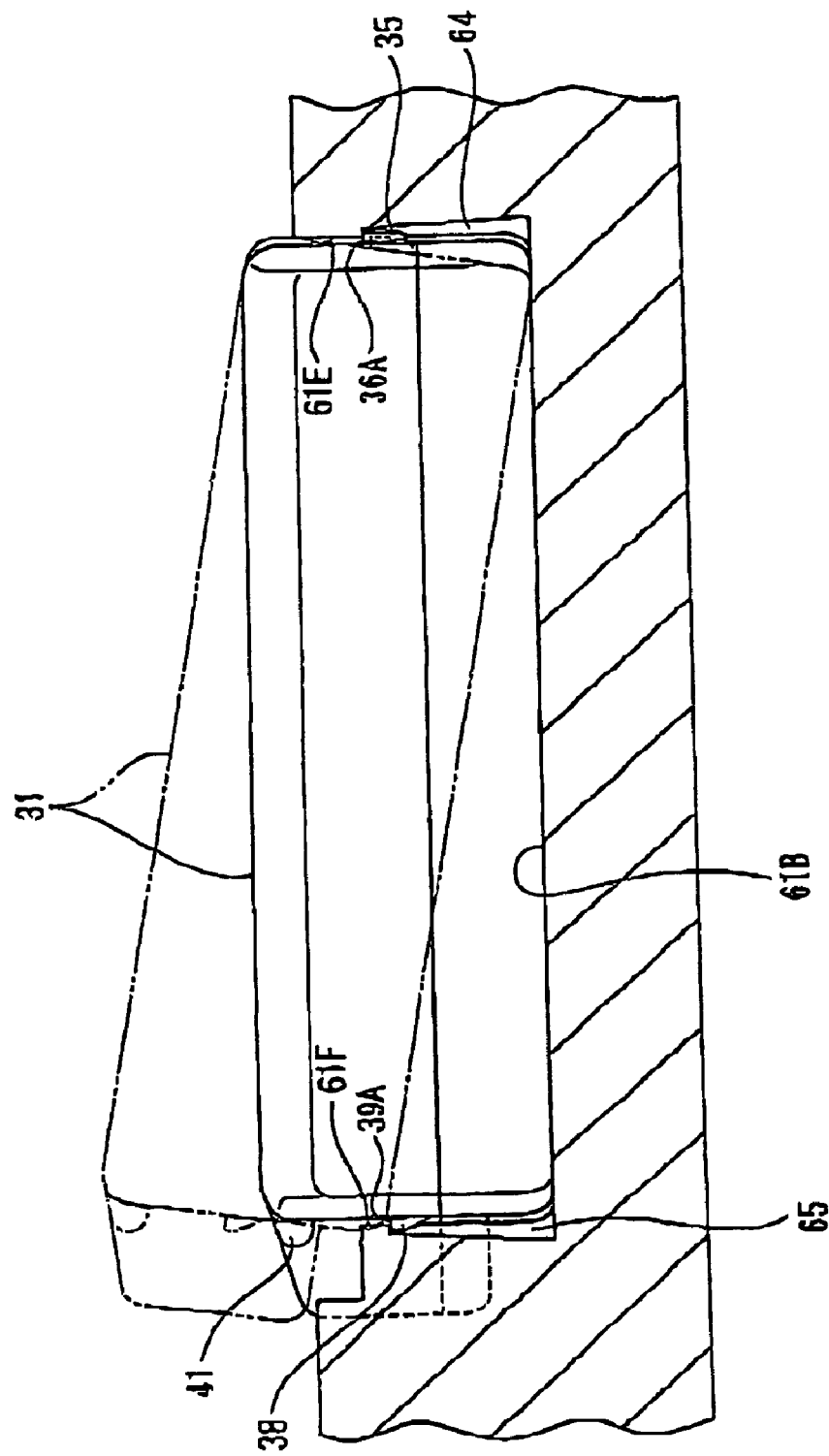
FIG. 7 is a cross-sectional view of the battery pack storage according to the present embodiment.
Figure 8:
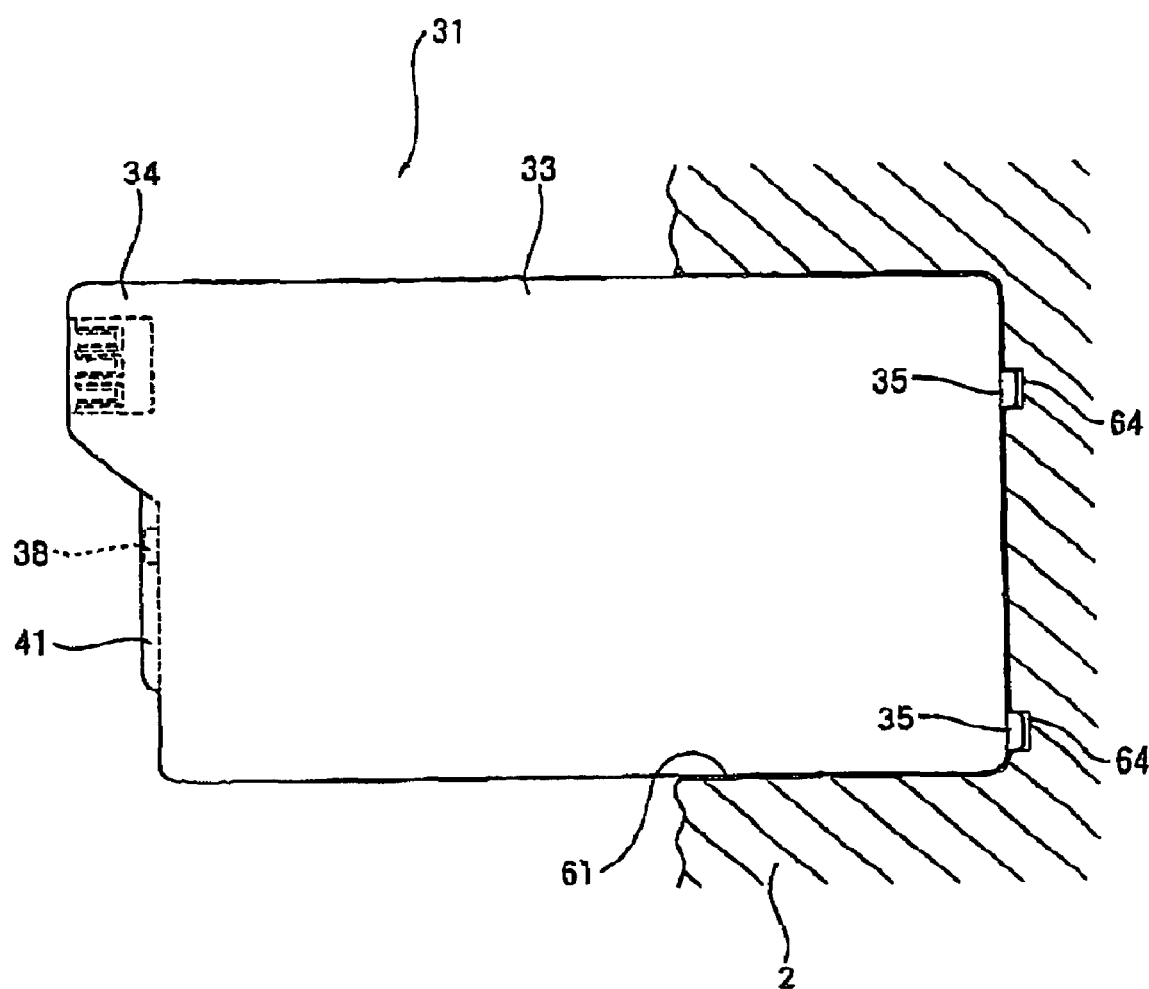
FIG. 8 is a plan view of the battery pack storage, a part of which is notched, according to the present embodiment.

<Description of FIGS. 6, 7 and 8 (Description of the Battery Pack Storing Space)>

FIG. 6 is a perspective view of the battery pack storing section 23 of the case 2, FIG. 7 is a cross sectional view of the battery pack storing section 23, and FIG. 8 is a partial notched plan view of the battery pack storing section 23 that stores the battery pack 31, viewed from the top the battery pack storing space 61 is formed in a concave shape having a surrounding wall and bottom wall, corresponding to the outline shape of the battery pack 31. In other words, the battery pack is formed in the concave shape having a bottom wall 61B on which the under surface 33B of the battery pack 31 is mounted, long side walls 61C, 61D and short side walls 61E, 61F, respectively opposed to the long aide surfaces 33C, 33D and the short side surfaces 33E, 33F of the battery pack 31. On the short side surface 61F, there is formed a trapezoid-shaped concave portion 62 in which the output section 34 is stored.

Two guide ribs 63 are integrally formed on the long sidewalls 61C and 61D with a predetermined distance, in such a manner as projecting from the walls, which reach the bottom wall 61 from a middle position in the height direction. Each guide rib 63 has an oblique surface being formed in such a manner the internal surface gradually approaches the long side walls 61C, 61D along the direction toward the upper edge. On the short sidewall 61E, there are formed two locking grooves 64 with a predetermined distance therebetween, serving as locking portions for engaging the engagement projection 35 of the battery pack 31 (see FIG. 8). One locking groove 65 is formed on the short side surface 61F serving as a locking portion with which the engagement projection 38 or the battery pack 31 is engaged (see FIG. 6). Each of the locking grooves 64, 65 are formed in a length reaching the bottom wall 61B from the middle position in the height direction of the short side walls 61E, 61F.

The trapezoid-shaped concave portion 62 is formed at a higher position than the bottom wall 61B on which the main body 33 of the battery pack 31 is stored, and three terminals 71 are provided in such a manner as projecting upwardly from the circuit board (not illustrated) installed in the case 2. In other words, a strengthening block 72 covers around the root portion of the three terminals 71 projecting from the circuit board, and this strengthening block 72 is placed on a part of the bottom wall 62B of the trapezoid-shaped concave portion 62.

<Operation for Mounting the Battery Pack>

In order to store the battery pack 31 into the battery pack storing space 61 of the case 2, as shown in FIG. 7, the end portion of the battery pack 31 opposite of the output terminal 47 side, that is, the end portion on the short side wall 33E side is inserted into the battery pack storing space 61 in a slanting direction, so that engagement projections 35 are engaged with the engagement grooves 64. Afterwards, the other end portion on the output section 34 side is gradually tilted in the horizontal direction pivoting around the end portion already inserted, and then the inclined surface of the engagement projection 38 is inserted in such a manner as abutting against the short side wall 61F of the battery pack storing space 61.

In a status where most part of the battery pack 31 is placed within the battery pack storing space 61, the output terminal 47 starts contacting the terminal 71 provided in the battery pack storing space 61. When the end portion on the output terminal 34 side is further tilted in the horizontal direction gradually, the output terminal 47 goes onto the terminal 71 being contacted in sliding manner. Almost simultaneously, the locking surface 39A of the engagement projection 38 reaches the locking groove 65 in the battery pack storing space 61. Then, the locking surface 39A is fixed in a status being inserted in the locking groove 65. Therefore, only by inserting one end of the battery pack 31 in a slanting direction and inserting the other end in such a manner as being tilted in the horizontal direction, it is possible to store the battery pack 31 into the battery pack storing space 61 of the entertainment apparatus 1.

<Operation for Ejecting the Battery Pack>

The battery pack 31 is ejected from the battery pack storing space 61 of the case 2, by placing a finger on the ejection-purpose fingerhold 41 and lifting the battery pack 31 while pressing towards the opposite side. Then, the locking surface 39A of the engagement projection 38 is detached from the locking groove 65 in the battery pack storing space 61, and simultaneously the output terminal 47 of the battery pack 31 is detached from the terminal 71. Thereafter, the battery pack 31 is gradually made upright, and then, the battery pack 31 can be taken out from the battery pack storing space 61. At this stage, since the two engagement projections 35 are provided at positions with approximately equal distance from the ejection-purpose fingerhold 41 as a center, the battery pack is allowed to be upright without being tilted. Therefore, the ejecting operation can be easily performed.

<Effects of the Embodiment>

(1) Even when the battery pack 31 is placed on a table and the like with the under surface 33B facing below, there is a low possibility that the output terminal 47 directly comes into contact with the upper surface of the table, since a space is formed between the surface of the table and the output terminal 47. Therefore, it is possible to enhance the short-circuit prevention effect.

(2) Since there is a space between the virtual plane including the under surface 33B of the case 32 and the output section 34 on which the output terminal 47 is provided, even in the case where a strengthening block 72 is placed on the root portion of the terminal 71 projecting from the circuit board on the case 2 side, the space formed below the output section 34 can absorb the part of the strengthening block 72. In other words, since there is no interference with the strengthening block 72, it is possible to enhance the degree of flexibility in designing the battery pack storing space 61.

(3) When the battery pack 31 is stored in the battery pack storing space 61, the end portion on the side opposite of the output terminal 47 side is inserted in a slanting direction into the battery pack storing space 61, and the other end portion on the output terminal 47 side is gradually tilted in the horizontal direction pivoting about the end portion already inserted. Then, after most part of the battery pack 31 is stored in the battery pack storing space 61, the output terminal 47 comes into contact with the terminal 71 provided on the case 2 side. Therefore, the terminals 47 and 71 are less damaged.

(4) Since the battery pack proceeds into the battery pack storing space while the output terminal 47 being in contact with the terminal 71, that is, those terminals come into contact in a status rubbing against each other, electrical connection between the terminals are ensured.

(5) The engagement projections 35 and 38 are respectively provided on the short side walls 33E, 33F of the case 32, that is, on the plane opposite of the plane on which the output terminal 47 is provided, and on the plane on which the output terminal 47 is provided. As for the battery pack storing space 61, the locking grooves 64, 65 for locking the engagement projections 35 and 38 of the battery pack 31 are formed on the opposed short side walls 61E, 61F. Therefore, it is possible to securely hold the battery pack 31 within the battery pack storing space 61.

(6) The engagement projection 38 is formed in a horseshoe shape having the horizontal piece 39 and vertical pieces 40, and the outer surface of the vertical pieces 40 is formed on an inclined plane gradually approaching the case outer surface along the direction from the horizontal piece 39 towards the under surface 33B. Therefore, after the engagement projections 35 are engaged with the locking grooves 64 of the battery pack 31, and the end portion on the output section side is gradually tiled in the horizontal direction pivoting about the inserted end portion, the inclined plane of the vertical pieces 40 of the engagement projection 38 is inserted in such a manner as abutting against the short side wall 61F of the battery pack storing space 61. Accordingly, the battery pack 31 is allowed to be stored in the battery pack storing space 61 without applying unreasonable force. In other words, with a simple operation such that one end portion of the battery pack 31 is inserted in a slanting direction, and the other end portion is inserted in such a manner as tilted into the horizontal direction, it is possible to store the battery pack 31 into the battery pack storing space 61. Therefore, the battery can be mounted easily, and also the battery can be held securely.

(7) The output section 34 of the battery pack 31 is provided in such a manner as deviated towards a corner of one side on the short side surface 33F of the main body 33 and the ejection-purpose fingerhold 41 is provided between the output section 34 and the other corner. Therefore, when the battery pack 31 is ejected from the battery pack storing space 61, the end portion of the battery pack 31 on the output section 34 side is allowed to be upright by placing a finger on the ejection-purpose fingerhold 41. Therefore, the operation for ejection the battery pack 31 can be easily performed.

(8) In the ejecting operation, two engagement projections 35 are provided at positions with approximately the same distance from the ejection-purpose fingerhold 41 as a center. Therefore, when the battery pack 31 is ejected from the battery pack storing space 61, the battery pack 31 is allowed to be upright without being tilted. Therefore, also with the configuration above, ejecting operation can be easily performed

MODIFIED EXAMPLES

As for the shape of the battery pack 31, it is not limited to the rectangular box shape (flat rectangular parallelepiped shape) as described in the above embodiment. As far as it is shaped such that a different-level portion is provided with a space in the orthogonal direction with respect to a virtual plane including the mount reference plane for electronic equipment of the case 32, any shape or mode may be applicable. For example, the battery pack may have a thickness in such a manner as projecting from the battery pack storing space 61. In the case above, the cover 24 is not necessary.

Figure 9:
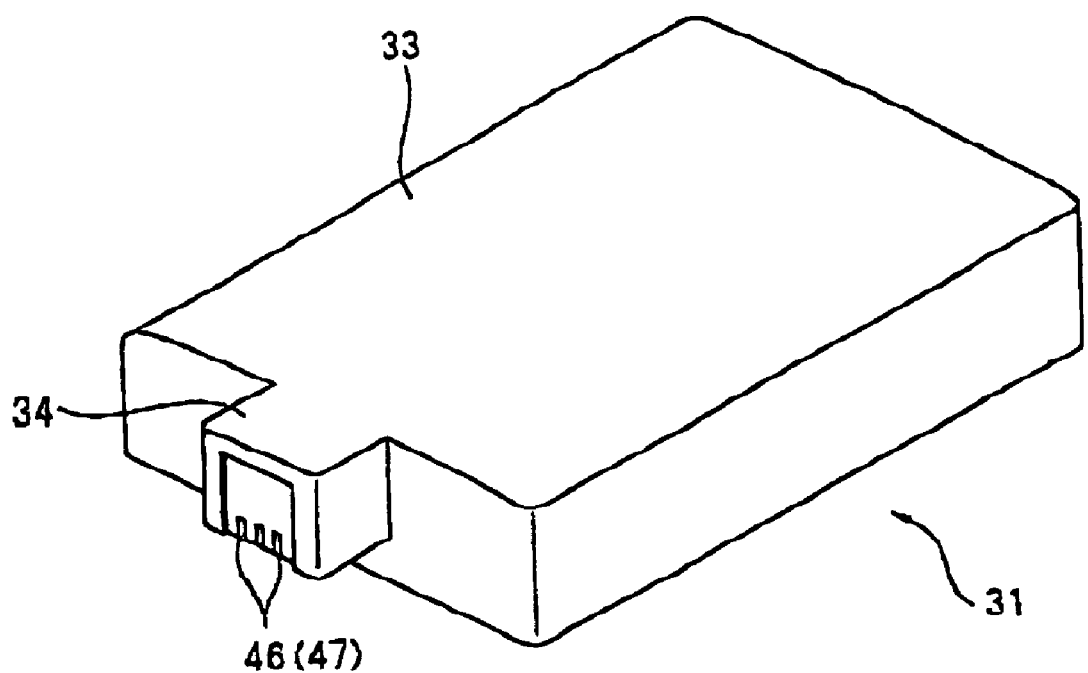
FIG. 9 is a perspective view showing the first modified example of the battery pack according to the present invention.
Figure 10:
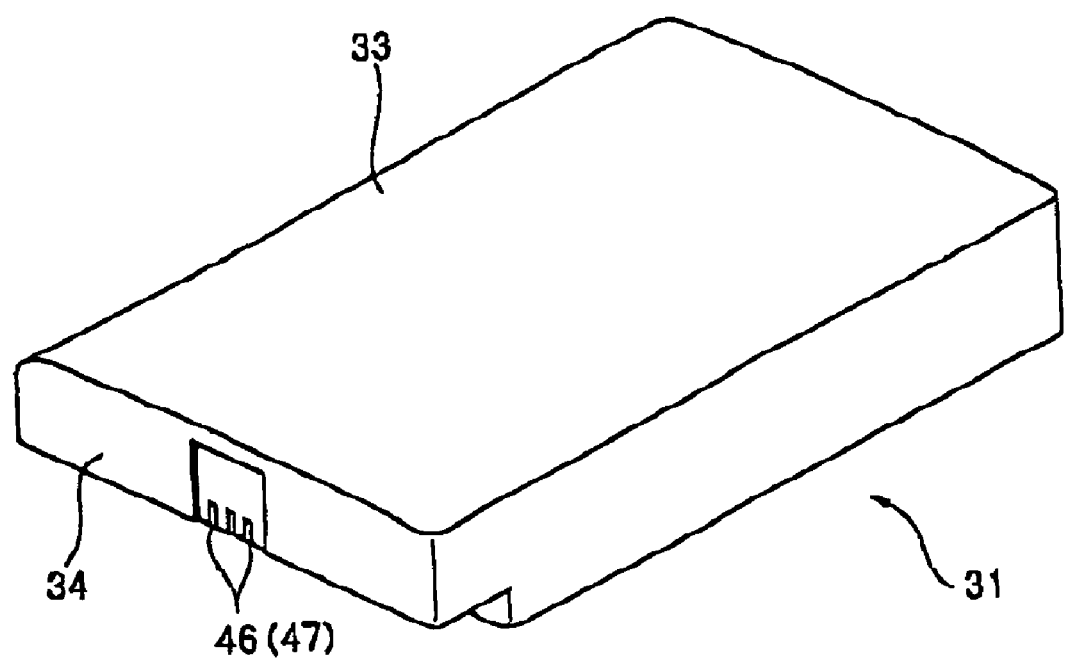
FIG. 10 is a perspective view showing the second modified example of the battery pack according to the present invention.
Figure 11:
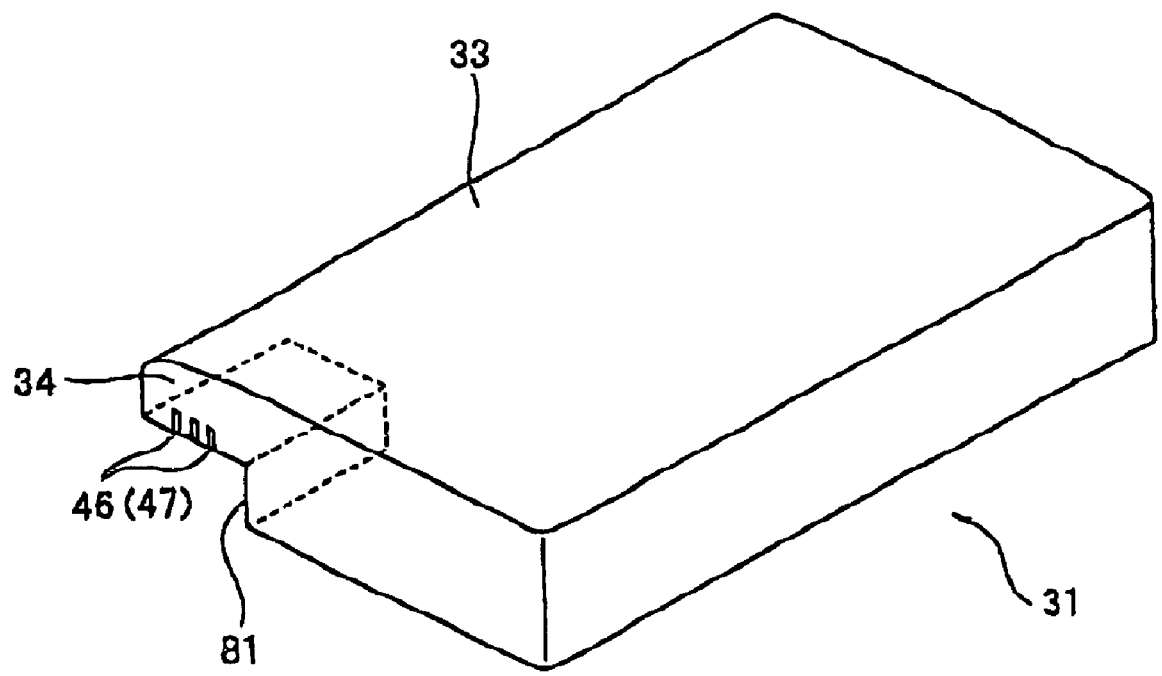
FIG. 11 is a perspective view showing the third modified example of the battery pack according to the present invention.
Figure 12:
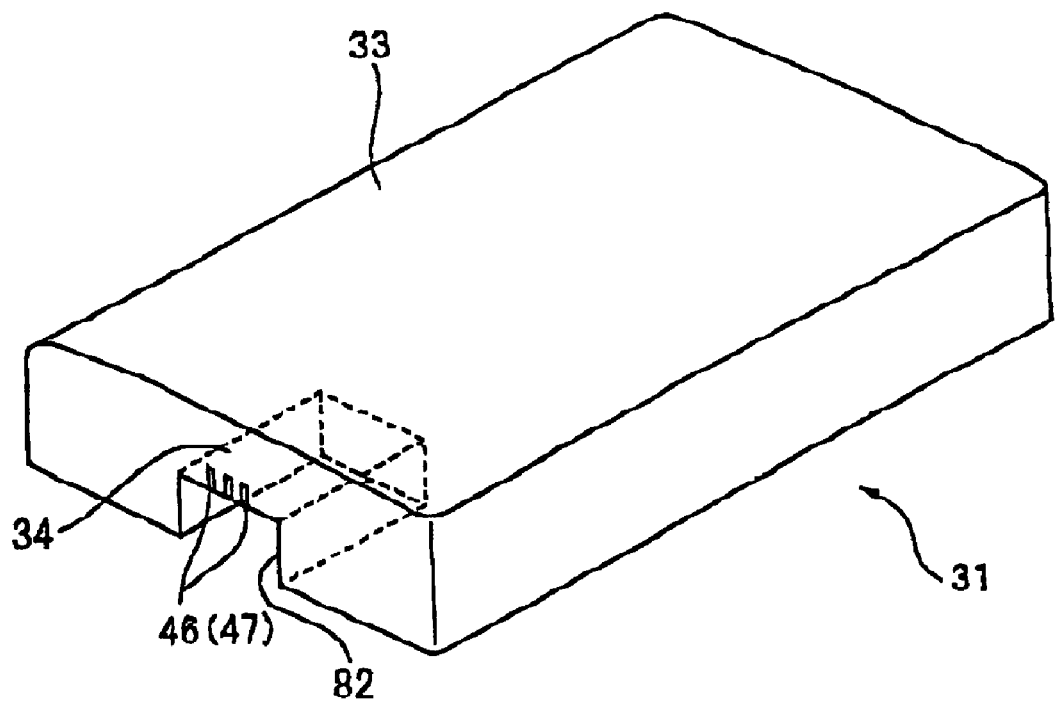
FIG. 12 is a perspective view showing the fourth modified example of the battery pack according to the present invention.

As a configuration of the different-level portion provided with a space in the orthogonal direction with respect to a virtual plane including the mount reference plane for electronic equipment of the case 32, it is not limited to the structure as explained in the above embodiment. For example, it may be configured as shown in FIG. 9 to FIG. 12. In the configuration as shown in FIG. 9, the output section 34 constituting the different-level portion is integrally formed in such a manner as projecting from the center of one plane of the main body 33. In the configuration as shown in FIG. 10, the output section 34 constituting the different-level portion is integrally formed in such a manner as projecting from the entire width of one plane of the main body 33. In the configuration as shown in FIG. 11, a notched portion 81 is formed on the corner of lower surface side (mount reference plane side) of one plane of the main body 33, and the output section 34 constituting the different-level portion is formed immediately above the notched portion 81. In the configuration as shown in FIG. 12, a notched portion 82 is formed in the center of the lower surface side (mount reference plane side) of one plane of the main body 33, and the output section 34 constituting the different-level portion is formed immediately above the notched portion 82.

In the above embodiment, the engagement projections 35, 38 are formed on the battery pack 31, and the locking grooves 64, 65 are formed in the battery pack storing space 61. However, this structure may be reversed. In the above embodiment, the ejection-purpose fingerhold 41 is formed on the battery pack 31. However, also on the case 2 side, a groove and the like may be formed in the proximity of the battery pack storing space 61, allowing the finger to be inserted therein easily. The ejection-purpose fingerhold 41 is not limited to the configuration as described in the above embodiment, and it may be a groove, hole, or the like.

INDUSTRIAL APPLICABILITY

The present invention can be utilized in portable electronic equipment such as a portable type game machine, a Personal Digital Assistants (PDA), a portable phone, and CD player, and a power source for the equipment.

What is claimed is:

1. A battery pack which is used in a status being mounted on electronic equipment, a battery being built in a case and an output terminal electrically connected to the battery, the output terminal being mounted in such a manner as to be directed towards the outside of said case, wherein
said case comprises a main body having an approximately rectangular box shape with said battery built therein, and an output section having said output terminal formed on one plane of said main body,
said main body comprises:
a mount reference plane of the case for the electronic equipment;
an opposing surface opposing the mount reference plane;
a pair of first side surfaces respectively opposing each other and respectively substantially perpendicular to the mount reference plane and the opposing surface; and
a pair of second side surfaces respectively opposing each other and respectively substantially perpendicular to the mount reference plane and the opposing surface,
wherein said opposing surface is gradually curved from at least one surface of said pair of first side surfaces, in a direction to deviate from said mount reference plane as said opposing surface reaches a central portion between the pair of first side surfaces,
wherein said output section is formed in a projecting manner on a surface of one of said pair of second side surfaces of said main body in a position deviated towards one corner formed by said first side surfaces adjoining the second side surfaces and in a position spaced apart into a direction orthogonal to a virtual plane including said mount reference plane,
wherein an engagement for engaging said electronic equipment is formed on one surface where said output section is formed, of said pair of second side surfaces, and in the central portion between said pair of first side surfaces, and
on said one surface where said output section is formed, of said pair of second side surfaces, in the central portion between said pair of first side surfaces, and on the verge of said opposing surface, an ejection-purpose fingerhold which projects from the second side surfaces and aligned with said output section formed in projecting manner on the second side surfaces is provided.

2. A battery pack according to claim 1, wherein
slit grooves are formed on the side of said virtual plane of said output section,
said output terminal is provided within said slit grooves, and
when said battery pack is stored in a battery pack storing space of said electronic equipment, a terminal of the electronic equipment projected in the battery pack storing space proceeds into said slit grooves of said output section to connect to said output terminal.

3. A battery pack according to claim 1, wherein
engagements to be engaged with said electronic equipment are provided on another surface where said output section is not formed, of said pair of second side surfaces, and at positions respectively on the both sides of a virtual axis which passes through the center of said ejection-purpose fingerhold to the second side surfaces.

4. A battery pack according to claim 2, wherein
engagements to be engaged with said electronic equipment are provided respectively on said another surface where said output section is not formed, of said pair of second side surfaces, and at positions on the both sides of a virtual axis which passes through the center of said ejection-purpose fingerhold to the second side surfaces.

5. A battery pack according to claim 3, wherein
said engagement provided on said another surface where said output section is not formed, of said pair of second side surfaces, is a first engagement,
said engagement provided on said one surface where said output section is formed, of said second side surfaces, is a second engagement, and
said first engagement is formed by an engagement projection which projects from said second side surfaces and has a locking surface approximately parallel to said mount reference plane, and
said second engagement is formed by an engagement projection which projects from said second surfaces and has a locking surface approximately parallel to said mount reference plane together with an inclined plane gradually approaching the case outer surface along the direction from a trip end of the locking surface to said mount reference plane.

6. A battery pack according to claim 4, wherein
said engagement provided on said another surface where said output section is not formed, of said pair of second side surfaces, is a first engagement,
said engagement provided on said one surface where said output section is formed, of said second side surfaces, is a second engagement, and
said first engagement is formed by an engagement projection which projects from said second side surfaces and has a locking surface approximately parallel to said mount reference plane, and
said second engagement is formed by an engagement projection which projects from said second surfaces and has a locking surface approximately parallel to said mount reference plane together with an inclined plane gradually approaching the case outer surface along the direction from a trip end of the locking surface to said mount reference plane.

7. Electronic equipment comprising a battery pack storage which stores the battery pack according to claim 1.

8. Electronic equipment comprising a battery pack storage which stores the battery pack according to claim 2.

9. Electronic equipment comprising a battery pack storage which stores the battery pack according to claim 3.

10. Electronic equipment comprising a battery pack storage which stores the battery pack according to claim 4.

11. Electronic equipment comprising a battery pack storage which stores the battery pack according to claim 5.

12. Electronic equipment comprising a battery pack storage which stores the battery pack according to claim 6.

* * * * *